United States Patent
Tanigawa et al.

(10) Patent No.: US 8,955,788 B2
(45) Date of Patent: Feb. 17, 2015

(54) FILAMENT WINDING APPARATUS

(75) Inventors: Motohiro Tanigawa, Kyoto (JP);
Daigoro Nakamura, Kyoto (JP);
Tadashi Uozumi, Kyoto (JP); Ken Hatta, Toyota (JP)

(73) Assignee: Murata Machinery, Ltd., Kyoto (JP)

( * ) Notice: Subject to any disclaimer, the term of this patent is extended or adjusted under 35 U.S.C. 154(b) by 322 days.

(21) Appl. No.: 13/605,301

(22) Filed: Sep. 6, 2012

(65) Prior Publication Data
US 2013/0068873 A1  Mar. 21, 2013

(30) Foreign Application Priority Data
Sep. 16, 2011  (JP) .................... 2011-203632

(51) Int. Cl.
*B21C 47/14* (2006.01)
*H01F 41/06* (2006.01)
*B29C 53/60* (2006.01)
*B29C 53/80* (2006.01)

(52) U.S. Cl.
CPC .............. *B21C 47/14* (2013.01); *B29C 53/602* (2013.01); *B29C 53/8016* (2013.01)
USPC ..................... 242/439.5; 242/438; 242/441.4

(58) Field of Classification Search
USPC ............ 242/438, 438.1, 439.5, 440.1, 441.2, 242/441.4
See application file for complete search history.

(56) References Cited

U.S. PATENT DOCUMENTS

| | | | | |
|---|---|---|---|---|
| 1,725,540 | A * | 8/1929 | Robinson | 57/10 |
| 2,561,562 | A * | 7/1951 | Collins | 242/433.1 |
| 3,236,039 | A * | 2/1966 | Fletcher, Jr. et al. | 57/18 |
| 3,255,976 | A * | 6/1966 | Mede | 242/436 |
| 4,256,268 | A * | 3/1981 | Fahrbach | 242/439.5 |
| 4,484,974 | A * | 11/1984 | Rothman | 242/439.5 |
| 7,780,110 | B2 * | 8/2010 | Uozumi et al. | 242/444 |
| 7,905,442 | B2 | 3/2011 | Uozumi et al. | 242/439.5 |

FOREIGN PATENT DOCUMENTS

JP   2010-005831   1/2010

* cited by examiner

*Primary Examiner* — Emmanuel M Marcelo
(74) *Attorney, Agent, or Firm* — DLA Piper LLP (US)

(57) ABSTRACT

A filament winding apparatus includes a hoop winding device mounted with bobbins that supply a fiber bundle. Each of the bobbins is whirled around a periphery of a liner to wind the fiber bundle around an outer peripheral surface of the liner. The hoop winding device is replaceable with another hoop winding device at a predetermined position.

15 Claims, 9 Drawing Sheets

FILAMENT WINDING APPARATUS

CROSS-REFERENCE TO RELATED APPLICATIONS

This application claims priority under 35 U.S.C. 119 to Japanese Patent Application No. 2011-203632, filed on Sep. 16, 2011, which application is hereby incorporated by reference in its entirety.

BACKGROUND OF THE INVENTION

1. Field of the Invention

The present invention relates to a filament winding apparatus and a method for replacing a hoop winding device of a filament winding apparatus.

2. Description of the Related Art

A conventional filament winding apparatus winds a fiber bundle impregnated with resin around an outer peripheral surface of a liner. The filament winding apparatus includes a hoop winding device that winds the fiber bundle around the outer peripheral surface of the liner by rotating with the liner as a center (e.g., Japanese Unexamined Patent Publication No. 2009-61721).

The hoop winding device includes bobbins around which the fiber bundle is wound, and winds the fiber bundle supplied from the bobbins around the liner by rotating. Thus, a need to interrupt the winding operation of the fiber bundle and replace the bobbins arises when the fiber bundle wound around the bobbins becomes scarce.

However, if the winding operation of the fiber bundle is interrupted and the bobbins are replaced, a considerable time is required until resuming the winding operation of the fiber bundle, which degrades production efficiency.

BRIEF SUMMARY OF THE INVENTION

According to the present invention, a time required after a winding operation of a fiber bundle is interrupted and until the winding operation is resumed is reduced by providing a replaceable hoop winding device.

One embodiment of the present invention relates to a filament winding apparatus including a hoop winding device mounted with bobbins adapted to supply a fiber bundle, each of the bobbins being whirled around a periphery of a liner to wind the fiber bundle around an outer peripheral surface of the liner. The hoop winding device is configured to be replaced with another hoop winding device at a predetermined position.

Another embodiment of the present invention relates to a filament winding apparatus including a liner supporting shaft adapted to support a liner; and a substantially circular ring shaped hoop winding device adapted to rotate with the liner and the liner supporting shaft as a center to wind a fiber bundle around an outer peripheral surface of the liner. The liner supporting shaft is configured to be coupled or separated at an intermediate part in an axis center direction of the liner supporting shaft, and the hoop winding device is replaced with another hoop winding device by separating the liner supporting shaft.

In one aspect of the present invention, the filament winding apparatus further includes at least one other hoop winding device, and the hoop winding device is replaced with the other hoop winding device by separating the liner supporting shaft.

In another aspect of the present invention, the hoop winding device and the other hoop winding device are mounted on one rail, and the hoop winding device and the other hoop winding device are replaced by moving.

In another aspect of the present invention, the filament winding apparatus further includes a supporting shaft gripping device adapted to support the liner supporting shaft, wherein the supporting shaft gripping device separates the liner supporting shaft after supporting the liner supporting shaft, and the supporting shaft gripping device is separated from the liner supporting shaft after the liner supporting shaft is coupled.

According to one embodiment of the present invention, the hoop winding device can be replaced with another hoop winding device. Accordingly, the time required after the winding operation of the fiber bundle is interrupted and until the winding operation is resumed can be reduced.

According to another embodiment of the present invention, the substantially circular ring shaped hoop winding device can be replaced with another hoop winding device since the liner supporting shaft can be separated. Accordingly, the time required after the winding operation of the fiber bundle is interrupted and until the winding operation is resumed can be reduced.

According to one aspect of the present invention, the hoop winding device can be replaced with another hoop winding device since at least one other hoop winding device is arranged. Accordingly, the time required after the winding operation of the fiber bundle is interrupted and until the winding operation is resumed can be reduced.

According to a further aspect of the present invention, the hoop winding device and the other hoop winding device can be replaced by moving since the hoop winding device and the other hoop winding device are mounted on one rail. Accordingly, the time required after the winding operation of the fiber bundle is interrupted and until the winding operation is resumed can be reduced.

According to a further aspect of the present invention, one end of the liner supporting shaft can be supported when the liner supporting shaft is separated since the supporting shaft gripping device supports the liner supporting shaft. Distortion is thus prevented from occurring in the liner.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

First, a filament winding apparatus 100 (hereinafter referred to as "FW device 100") according to one embodiment of the present invention will be described.

Figure 1:
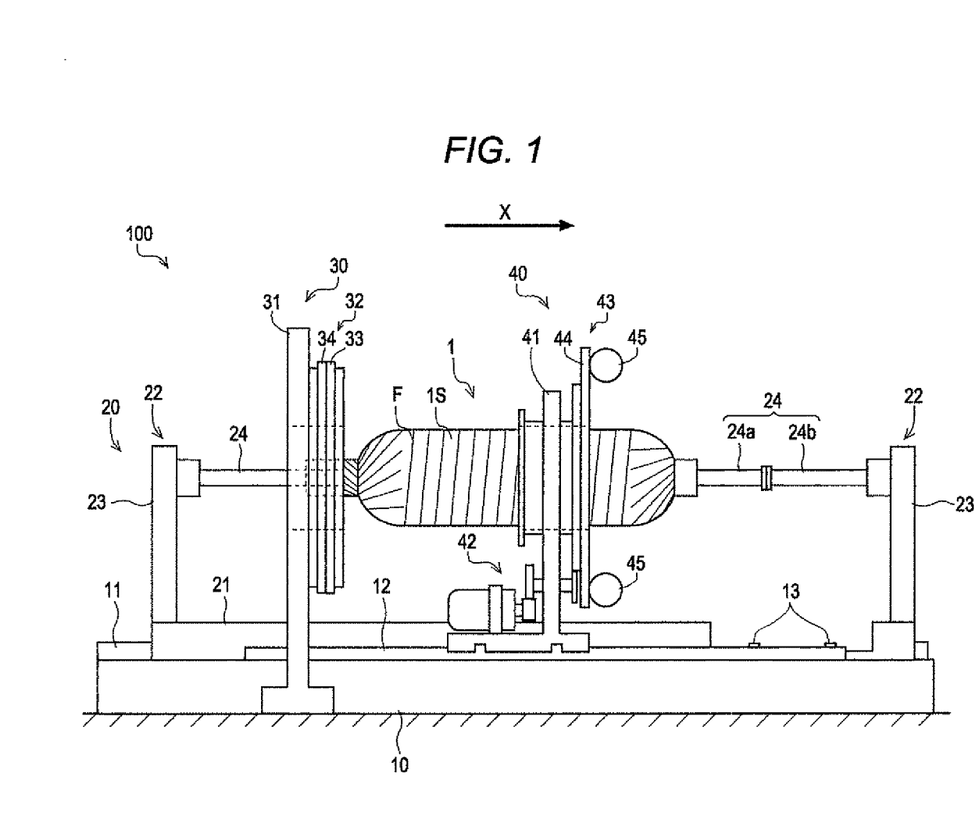
FIG. 1 is a side view showing an overall structure of a filament winding apparatus according to one embodiment of the present invention.

FIG. 1 is a side view showing an overall structure of the FW device 100. An arrow X shown in FIG. 1 indicates a transfer direction of a liner 1. A direction parallel to the transfer direction of the liner 1 is a front-back direction of the FW device 100, wherein one direction in which the liner 1 is transferred is defined as a front side (right side in FIG. 1) and the other direction is defined as a rear side (left side in FIG. 1). Since the FW device 100 allows the liner 1 to reciprocate in the front-back direction, the front side and the rear side are defined according to the transfer direction of the liner 1.

The FW device 100 is a device adapted to wind a fiber bundle F around an outer peripheral surface 1S of the liner 1. The FW device 100 mainly includes a main base 10, a liner transfer device 20, a helical winding device 30, and a hoop winding device 40.

The liner 1 is a substantially cylindrical hollow container made of a high strength aluminum material, polyimide resin, or the like, for example. A pressure resistant property of the liner 1 is improved by winding a fiber bundle F around the outer peripheral surface 1S of the liner 1. That is, the liner 1 becomes a base material that constitutes a pressure resistant container.

The main base 10 is a main structure configuring the basis of the FW device 100. A first rail 11 is arranged at an upper part of the main base 10. The liner transfer device 20 is mounted on the first rail 11. A second rail 12 is arranged at the upper part of the main base 10 in parallel with the first rail 11. The hoop winding device 40 is mounted on the second rail 12.

According to this structure, the main base 10 configures the basis of the FW device 100 and also enables the liner transfer device 20 and the hoop winding device 40 to move in the front-back direction of the FW device 100.

In the FW device 100 according to the present embodiment, a third rail 13 is arranged perpendicular to the second rail 12. Another hoop winding device 50 is mounted on the third rail 13 (see FIG. 3 to FIG. 9). The main base 10 thus enables the hoop winding device 50 to move perpendicular to the front-back direction of the FW device 100. The FW device 100 uses the rail as means for moving the hoop winding device 50, but other means may also be, used.

The liner transfer device 20 is a device for transferring the liner 1 while rotating. Specifically, the liner transfer device 20 is a device for rotating the liner 1 with the front-back direction of the FW device 100 as a center axis, and transferring the liner 1 in the front-back direction of the FW device 100. The liner transfer device 20 is configured mainly by a base 21 and liner supporting sections 22.

The base 21 includes a pair of liner supporting sections 22 at an upper part of the base 21. Each of the liner supporting sections 22 is configured by a liner supporting frame 23 and a liner supporting shaft 24, and is adapted to rotate the liner 1. Specifically, the liner supporting section 22 is configured by the liner supporting frame 23 extending from the base 21 towards the upper side, and the liner supporting shaft 24 extending in the front-back direction from the liner supporting frame 23. The liner 1 mounted on the liner supporting shaft 24 is rotated in one direction by a power mechanism.

According to this structure, the liner transfer device 20 rotates the liner 1 with the front-back direction of the FW device 100 as the center axis, and transfers the liner 1 in the front-back direction of the FW device 100.

In the FW device 100 according to the present embodiment, one liner supporting shaft 24 is configured by a first liner supporting shaft 24a and a second liner supporting shaft 24b. The second liner supporting shaft 24b can slidably move in an axis center direction of the second liner supporting shaft 24b. The liner supporting shaft 24 thus can be coupled or separated at an intermediate part of the axis center direction of the liner supporting shaft 24. The FW device 100 uses a structure for slidably moving the second liner supporting shaft 24b as means for coupling or separating the liner supporting shaft 24, but other means may also be used.

The helical winding device 30 is adapted to wind the fiber bundle F around the outer peripheral surface 1S of the liner 1. Specifically, the helical winding device 30 is adapted to perform so-called helical winding in which a winding angle of the fiber bundle F becomes a predetermined value with respect to the front-back direction of the FW device 100. The helical winding device 30 is mainly configured by a base 31 and a helical winding unit 32.

The helical winding unit 32 is arranged on the base 31. The helical winding unit 32 is configured by a fixed helical head 33 and a movable helical head 34, and is adapted to perform helical winding on the outer peripheral surface 1S of the liner 1. Specifically, the helical winding unit 32 is mainly configured by the fixed helical head 33 adapted to perform helical winding and the movable helical head 34 also adapted to perform helical winding. The fiber bundle F is guided to the outer peripheral surface 1S of the liner 1 by a fiber bundle guide arranged on the fixed helical head 33 and a fiber bundle guide arranged on the movable helical head 34, and the helical winding is carried out by passing the liner 1 while rotating.

According to such a structure, the helical winding device 30 enables the helical winding to be performed in which the winding angle of the fiber bundle F becomes a predetermined value with respect to the front-back direction of the FW device 100.

The hoop winding device 40 is adapted to wind the fiber bundle F around the outer peripheral surface 1S of the liner 1. Specifically, the hoop winding device 40 is adapted to perform so-called hoop winding in which the winding angle of the fiber bundle F becomes substantially perpendicular with respect to the front-back direction of the FW device 100. The hoop winding device 40 is mainly configured by a base 41, a power mechanism 42, and a hoop winding unit 43.

The hoop winding unit 43 rotated by the power mechanism 42 is arranged on the base 41. The hoop winding unit 43 is configured by a winding table 44 and bobbins 45, and is adapted to carry out hoop winding on the outer peripheral surface 1S of the liner 1. Specifically, the hoop winding unit 43 is mainly configured by the winding table 44 adapted to perform hoop winding, and the bobbins 45 adapted to supply the fiber bundle F to the winding table 44. The fiber bundle F is guided to the outer peripheral surface 1S of the liner 1 by a fiber bundle guide 47 (see FIG. 2) arranged on the winding table 44, and the hoop winding is carried out by rotating the winding table 44.

According to this structure, the hoop winding device enables the hoop winding to be performed in which the winding angle of the fiber bundle F becomes substantially perpendicular to the front-back direction of the FW device 100.

The structure of the hoop winding device 40 will be further described in detail with reference to FIG. 2.

Figure 2:
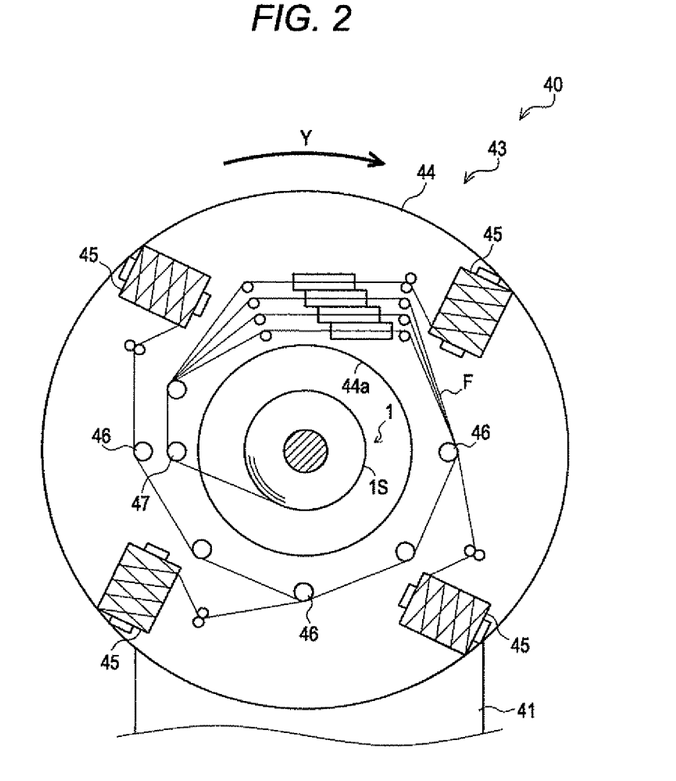
FIG. 2 is a front view showing a structure of a hoop winding device.

FIG. 2 is a front view showing a structure of the hoop winding device 40. An arrow Y shown in FIG. 2 indicates the rotating direction of the hoop winding device 40. The hoop winding device 50 has the same structure as the hoop winding device 40, and thus the description of the hoop winding device 50 will be omitted.

The hoop winding device 40 includes the bobbins 45, around which the fiber bundle F is wound, and winds the fiber bundle F supplied from such bobbins 45 around the liner 1 by rotating. Specifically, the fiber bundle F is wound around the outer peripheral surface 1S of the liner 1 when the winding table 44 and the bobbins 45 of the hoop winding device 40 are integrally rotated.

The winding table 44 is provided with a through-hole 44a in the front-back direction of the FW device 100 to form a substantially circular ring shape. As described above, since the liner transfer device 20 can transfer the liner 1 in the front-back direction of the FW device 100, and the hoop winding device 40 can move in the front-back direction of the FW device 100, the liner 1 can be inserted into the through-hole 44a.

The winding table 44 includes guide rollers 46 and the fiber bundle guide 47. The guide rollers 46 are adapted to guide the fiber bundle F supplied from the bobbins 45 to the fiber bundle guide 47. The fiber bundle guide 47 guides the fiber bundle F guided by the guide rollers 46 to the outer peripheral surface 1S of the liner 1.

According to this structure, the hoop winding device 40 can rotate with the liner 1 and the liner supporting shaft 24 as the center, thus enabling the fiber bundle F to be wound around the outer peripheral surface 1S of the liner 1.

Next, the operation in replacing the hoop winding device 40 with the hoop winding device 50 will be described.

The FW device 100 has a characteristic in being able to replace the hoop winding device 40 with the hoop winding device 50 when the fiber bundle F wound around the bobbins 45 becomes scarce. A similar operation can be carried out not only when the fiber bundle F wound around the bobbins 45 becomes scarce but also when a need to replace the hoop winding device 40 such as maintenance and the like arises.

The FW device 100 interrupts the winding operation of the fiber bundle F when it is determined that the fiber bundle F wound around the bobbins 45 is scarce. Herein, the winding operation of the fiber bundle F refers to all the operations of winding the fiber bundle F including the rotating operation, the transfer operation, and the like of the liner 1 by the liner transfer device 20, for example. However, since the FW device 100 cannot be interrupted in the middle of the winding steps by the helical winding device 30 and the hoop winding device 40, the FW device 100 is interrupted after such winding steps are completed. That is, when it is determined that the fiber bundle F wound around the bobbins 45 is scarce in the middle of the hoop winding, for example, the FW device 100 interrupts all the operations after the hoop winding is completed.

Figure 3:
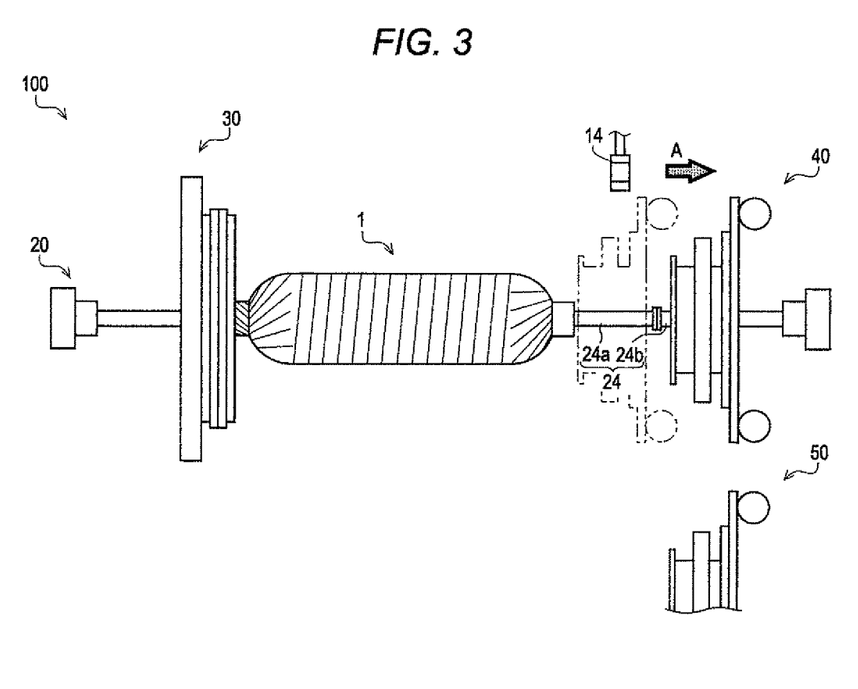
FIG. 3 is a plan view showing a state in which the hoop winding device is moved to a predetermined position.

First, as shown in FIG. 3, the FW device 100 moves the hoop winding device 40 to a predetermined position (see arrow A in FIG. 3). The FW device 100 mounts the hoop winding device 40 on the third rail 13 by moving the hoop winding device 40 (see FIG. 1).

Figure 4:
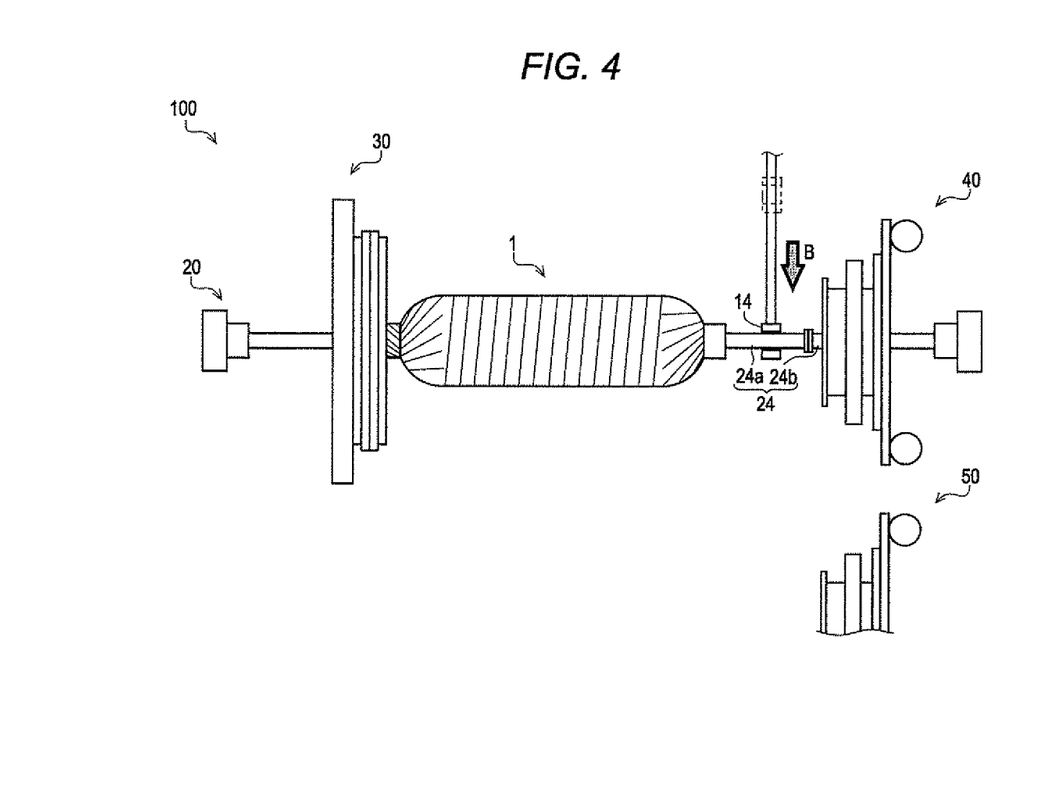
FIG. 4 is a plan view showing a state in which a liner supporting shaft is supported by a supporting shaft gripping device.

Next, as shown in FIG. 4, the FW device 100 supports the liner supporting shaft 24 with a supporting shaft gripping device 14 arranged on the main base 10. Specifically, the FW device 100 moves the supporting shaft gripping device 14 from a standby position (see arrow B in FIG. 4) to support the first liner supporting shaft 24a configuring the liner supporting shaft 24. The first liner supporting shaft 24a is a member of the liner supporting shaft 24 on the liner 1 side.

Figure 5:
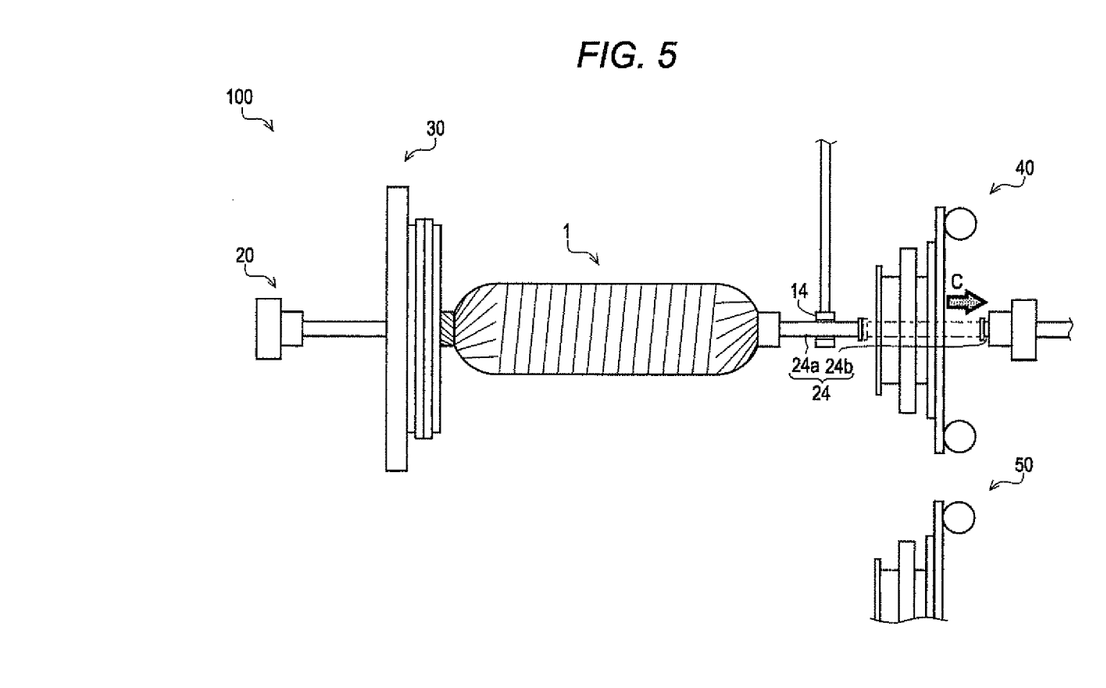
FIG. 5 is a plan view showing a state in which the liner supporting shaft is separated.

As shown in FIG. 5, the FW device 100 separates the liner supporting shaft 24 at an intermediate part in the axis center direction of the liner supporting shaft 24. Specifically, the FW device 100 slidably moves the second liner supporting shaft 24b in the axis center direction (see arrow C in FIG. 5) to be separated from the first liner supporting shaft 24a. The liner supporting shaft 24 is separated to a degree in which at least the hoop winding device 40 and the hoop winding device 50 can be passed through.

Figure 6:
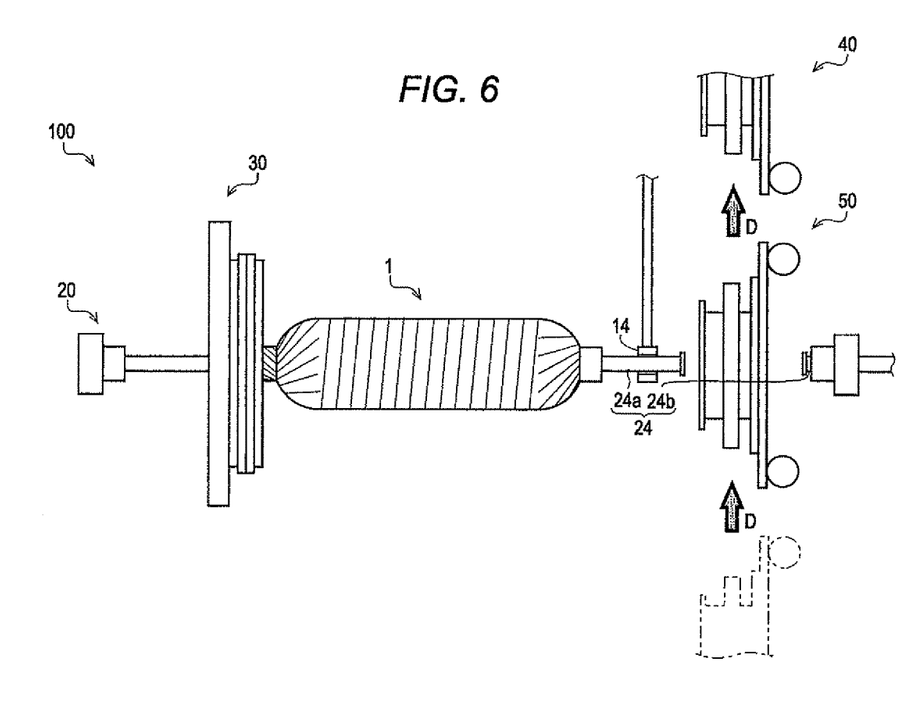
FIG. 6 is a plan view showing a state in which the hoop winding device is replaced with another hoop winding device.

Next, as shown in FIG. 6, the FW device 100 replaces the hoop winding device 40 in which the remaining amount of the fiber bundle F is scarce (hereinafter, referred to as old hoop winding device 40) with the hoop winding device 50 in which the fiber bundle F is fully-wound (hereinafter, referred to as new hoop winding device 50) by moving. Specifically, the FW device 100 moves the old hoop winding device 40 mounted on the third rail 13 to an escaped position, and moves the new hoop winding device 50 so as to be coaxial with respect to the liner supporting shaft 24 (see arrows D in FIG. 6). The old hoop winding device 40 is thus replaced with the new hoop winding device 50.

Figure 7:
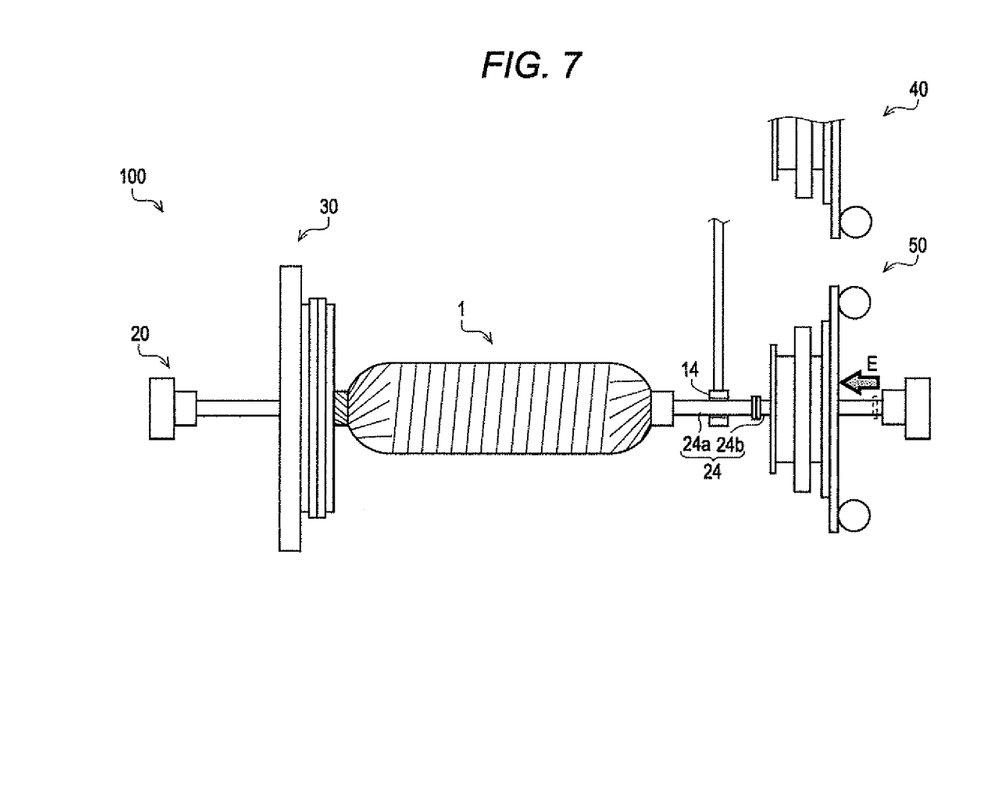
FIG. 7 is a plan view showing a state in which the liner supporting shaft is coupled.

Next, as shown in FIG. 7, the FW device 100 couples the liner supporting shaft 24. Specifically, the FW device 100 slidably moves the second liner supporting shaft 24b in the axis center direction (see arrow E in FIG. 7) to be coupled with the first liner supporting shaft 24a. The first liner supporting shaft 24a and the second liner supporting shaft 24b thus can be integrally rotated.

Figure 8:
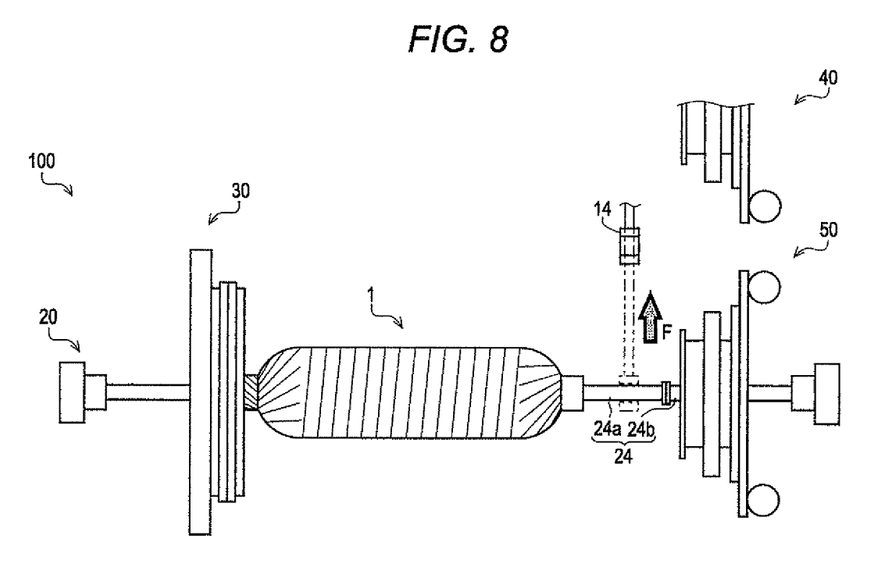
FIG. 8 is a plan view showing a state in which the supporting shaft gripping device is separated from the liner supporting shaft.

Next, as shown in FIG. 8, the FW device 100 separates the supporting shaft gripping device 14 away from the liner supporting shaft 24. Specifically, the FW device 100 moves the supporting shaft gripping device 14 (see arrow F in FIG. 8) to set the supporting shaft gripping device 14 at the standby position. The supporting shaft gripping device 14 thus can be prevented from interfering with the new hoop winding device 50.

Figure 9:
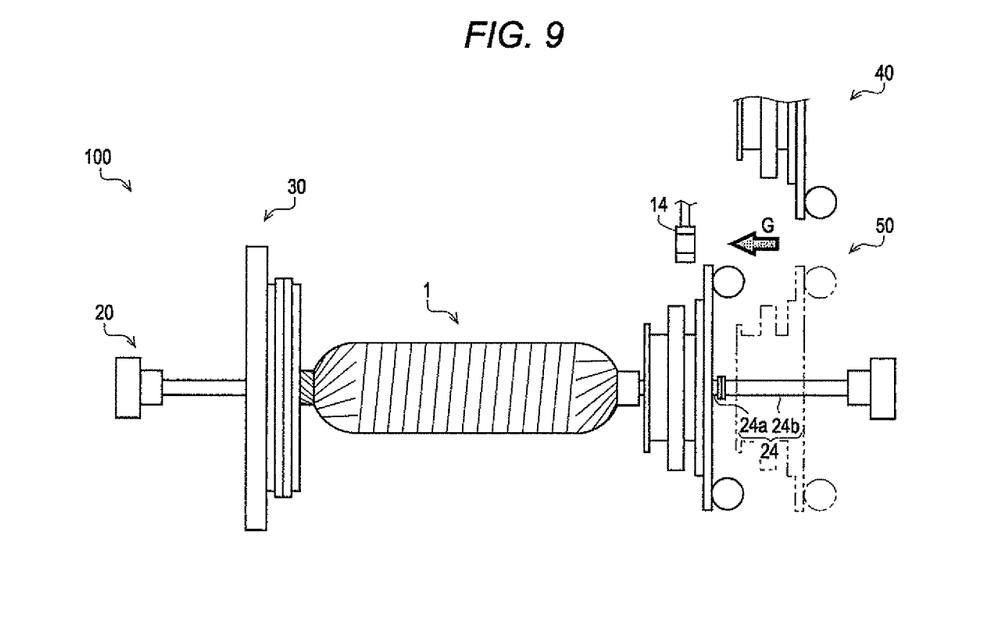
FIG. 9 is a plan view showing a state in which the hoop winding device is moved to a predetermined position.

Next, as shown in FIG. 9, the FW device 100 moves the new hoop winding device 50 to a predetermined position (see arrow G in FIG. 9). The FW device 100 thus can perform the hoop winding using the new hoop winding device 50.

According to this operation, the FW device 100 can reduce the time required after the winding operation of the fiber bundle F is interrupted and until the winding operation is resumed. This is because it is faster to replace the old hoop winding device 40 with the new hoop winding device 50 rather than replacing the bobbins 45.

The FW device 100 can perform the bobbin replacing operation of the old hoop winding device 40 that is moved to the escaped position at an arbitrary time. Thus, the FW device 100 is improved also in operability and maintenance property.

Furthermore, the FW device enables one end of the liner supporting shaft 24 to be supported by the supporting shaft gripping device 14. Thus, the bending load applied on the liner 1 when the liner supporting shaft 24 is separated can be reduced, thereby preventing distortion from occurring in the liner 1.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A filament winding apparatus comprising:
a liner supporting shaft adapted to support a liner; and
a substantially circular ring shaped hoop winding device adapted to rotate with the liner and the liner supporting shaft as a center to wind a fiber bundle around an outer peripheral surface of the liner, wherein
the liner supporting shaft is configured to be coupled or separated at an intermediate part in an axis center direction of the liner supporting shaft, and
the hoop winding device is configured to be replaced with another hoop winding device by separating the liner supporting shaft.

2. The filament winding apparatus according to claim 1, further comprising:
at least one other hoop winding device, wherein
the hoop winding device is replaced with the other hoop winding device by separating the liner supporting shaft.

3. The filament winding apparatus according to claim 2, wherein
the hoop winding device and the other hoop winding device are mounted on one rail, and
the hoop winding device and the other hoop winding device are replaced by moving.

4. The filament winding apparatus according to claim 2, further comprising:
a supporting shaft gripping device adapted to support the liner supporting shaft; wherein
the supporting shaft gripping device separates the liner supporting shaft after supporting the liner supporting shaft, and
the supporting shaft gripping device is separated from the liner supporting shaft after the liner supporting shaft is coupled.

5. The filament winding apparatus according to claim 3, further comprising:
a supporting shaft gripping device adapted to support the liner supporting shaft, wherein
the supporting shaft gripping device separates the liner supporting shaft after supporting the liner supporting shaft, and
the supporting shaft gripping device is separated from the liner supporting shaft after the liner supporting shaft is coupled.

6. The filament winding apparatus according to claim 1, further comprising:
a supporting shaft gripping device adapted to support the liner supporting shaft, wherein
the supporting shaft gripping device separates the liner supporting shaft after supporting the liner supporting shaft, and
the supporting shaft gripping device is separated from the liner supporting shaft after the liner supporting shaft is coupled.

7. A method for replacing a hoop winding device of a filament winding apparatus, the filament winding apparatus comprising a liner supporting shaft that supports a liner, wherein the hoop winding device rotates with the liner and the liner supporting shaft as a center to wind a fiber bundle around an outer peripheral surface of the liner, the method comprising:
replacing the hoop winding device with a new hoop winding device by separating the liner supporting shaft at an intermediate part in an axis center direction of the liner supporting shaft.

8. The method according to claim 7, wherein before replacing the hoop winding device with the new hoop winding device, the filament winding apparatus moves the hoop winding device to a predetermined position.

9. The method according to claim 8, wherein after moving the hoop winding device to the predetermined position, the filament winding apparatus supports the liner supporting shaft with a supporting shaft gripping device.

10. The method according to claim 9, wherein after supporting the liner supporting shaft with the supporting shaft gripping device, the filament winding apparatus separates the liner supporting shaft by slidably moving a second part of the liner supporting shaft in the axis center direction to be separated from a first part of the liner supporting shaft.

11. The method according to claim 10, wherein after separating the liner supporting shaft, the filament winding apparatus moves the hoop winding device to an escaped position, and moves the new hoop winding device to be coaxial with respect to the liner supporting shaft.

12. The method according to claim 11, wherein the hoop winding device and the new hoop winding device are moved on one rail.

13. The method according to claim 11, wherein after moving the new hoop winding device to be coaxial with respect to the liner supporting shaft, the filament winding apparatus couples the liner supporting shaft by slidably moving the second part of the liner supporting shaft in the axis center direction to be coupled with the first part of the liner supporting shaft.

14. The method according to claim 13, wherein after coupling the liner supporting shaft, the filament winding apparatus separates the supporting shaft gripping device from the liner supporting shaft by moving the supporting shaft gripping device to a standby position.

15. The method according to claim 14, wherein after separating the supporting shaft gripping device from the liner supporting shaft, the filament winding apparatus moves the new hoop winding device to a predetermined position such that hoop winding can be performed using the new hoop winding device.

* * * * *